(12) United States Patent
Simon et al.

(10) Patent No.: US 8,144,949 B2
(45) Date of Patent: Mar. 27, 2012

(54) METHOD FOR SEGMENTATION OF LESIONS

(75) Inventors: Richard A. Simon, Rochester, NY (US); Edward B. Gindele, Rochester, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1167 days.

(21) Appl. No.: 11/940,380

(22) Filed: Nov. 15, 2007

(65) Prior Publication Data

US 2009/0129673 A1    May 21, 2009

(51) Int. Cl.
*G06K 9/00* (2006.01)
(52) U.S. Cl. ............ 382/128; 382/173; 358/426.01
(58) Field of Classification Search ............ 382/128
See application file for complete search history.

(56) References Cited

U.S. PATENT DOCUMENTS

| 6,993,174 B2 | 1/2006 | Fan et al. | |
| 7,194,117 B2* | 3/2007 | Kaufman et al. | 382/128 |
| 2007/0064275 A1* | 3/2007 | Ohk | 358/426.01 |

OTHER PUBLICATIONS

D. L. Pham et al., A Survey of Current Methods in Medical Image Segmentation, Annual Review of Biomedical Engineering, vol. 2, pp. 1-26.

O. Wirjadi, Survey of 3d Image Segmentation Methods, Technical Report No. 123, Fraunhofer ITWM, Kaiserslautern, Germany 2007.

Jan-Martin Kuhnigk et al., Morphological Segmentation and Partial Volume Analysis for Volumetry of Solid Pulmonary Lesions in Thoracic CT Scans, IEEE Transactions on Medical Imaging, vol. 25, No. 4, Apr. 2006, pp. 417-434.

K. Krissan et al., Multiscale Segmentation of the Aorta in 3D Ultasound Images, 25th Annual Int. Conf. of the IEEE Engineering in Medicine and Biology Society (EMBS), Cancun, Mexico, 2003, pp. 638-641.

Paulo R.S. Mendonca et al., Model-Based Analysis of Local Shape for Lesion Detection in CT Scans, Proceedings of the International Conference on Medical Image Computing and Computer-Assisted Intervention (MICCAI 2005), Oct. 2005.

J. A. Sethian, Level Set Methods and Fast marching Methods, Cambridge University Press, 1999, ISBN 0 521 64557 3.

* cited by examiner

*Primary Examiner* — Phillip A Johnston

(57) ABSTRACT

A method of image segmentation includes receiving a set of voxels, segmenting the set of voxels into a foreground group and a background group, and classifying voxels of the foreground group as either lesion voxels or normal anatomy voxels. The method also includes blocking the normal anatomy voxels and performing a second segmentation on voxels of the background group and the lesion voxels, the second segmentation forming a stage two foreground group comprising the lesion voxels and a portion of the voxels of the background group. The method further includes classifying voxels of the stage two foreground group as either stage two lesion voxels or stage two normal anatomy voxels.

22 Claims, 15 Drawing Sheets

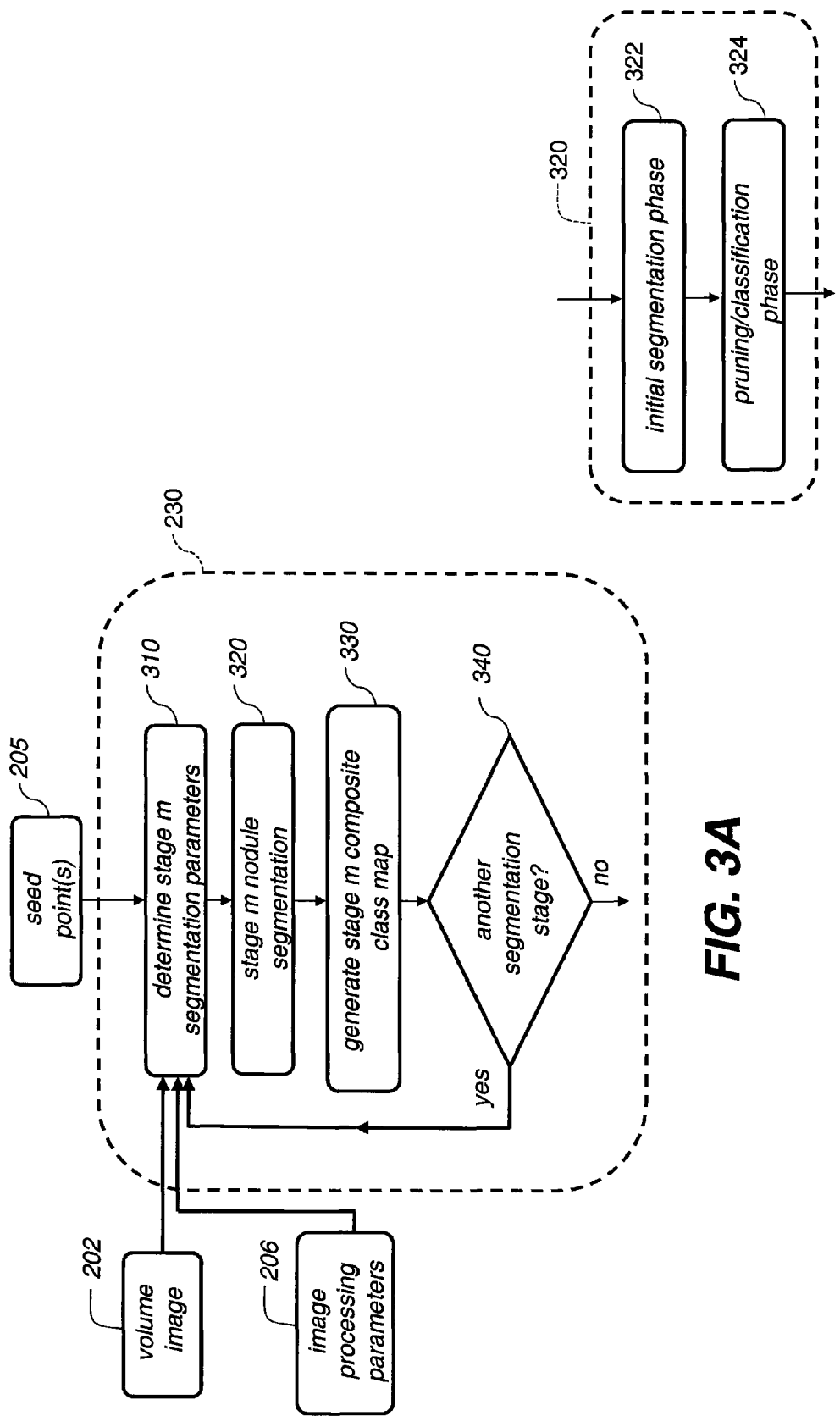

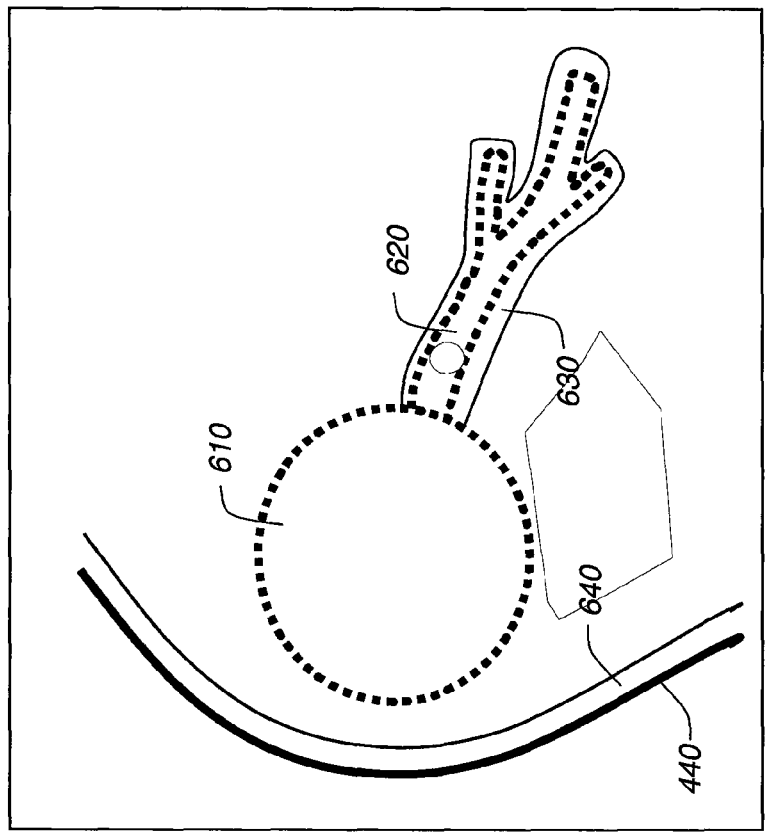
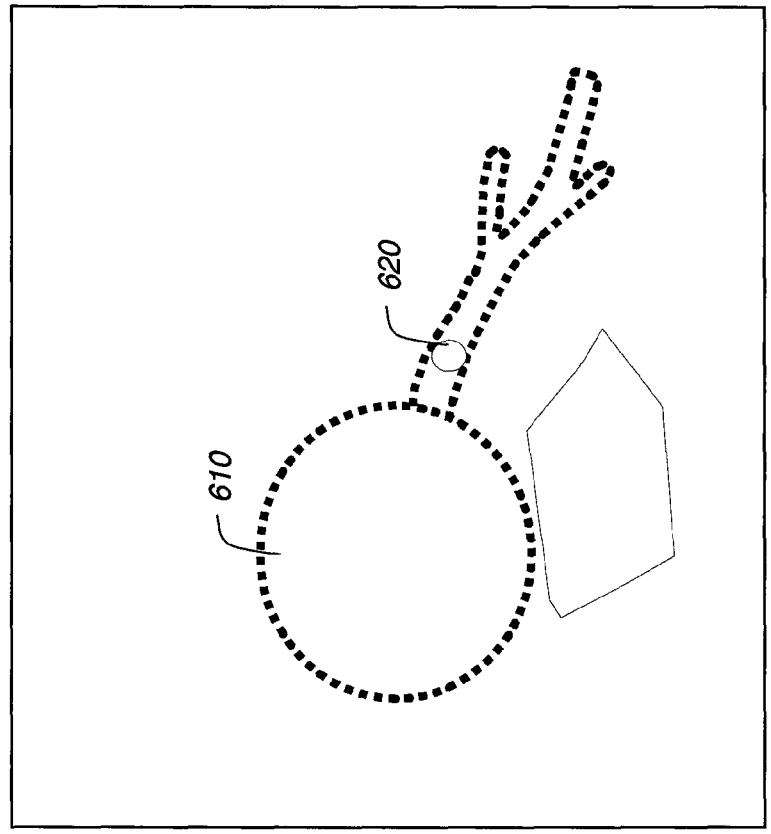

METHOD FOR SEGMENTATION OF LESIONS

CROSS REFERENCE TO RELATED APPLICATIONS

Reference is made to commonly-assigned copending U.S. patent application Ser. No. 11/567,857, filed Dec. 7, 2006 entitled ANALYZING LESIONS IN A MEDICAL DIGITAL IMAGE, by Simon et al., the disclosure of which is incorporated herein.

FIELD OF THE INVENTION

The present invention relates to the field of digital imaging, and more particularly to processing a digital image to segment an object in a 3-dimensional data set.

BACKGROUND OF THE INVENTION

Lung nodule size and growth rates are strong predictors of malignancy (and are used to distinguish benign from malignant). The determination of nodule size involves the manual outlining of a nodule's boundary. This is a tedious task due to the complex shape of nodules and that the nodule spans multiple slices. As a result boundary outlines are subject to individual radiologist interpretation and can lead to large inter-observer variation of the nodule's size estimate.

A method of automating the process is to have a computer perform such a task once the lesion has been identified. This task is commonly referred to in the image-processing domain as image or volume segmentation and techniques referred to as region growing are typically applied. Region growing algorithms typically use local image characteristics, such as image intensity variations to decide whether a neighboring voxel (3D volume images) or pixel (2D planar images) is to be added to the growing region. Nodules are frequently attached to other normal anatomy structures, including the local pulmonary vasculature and the pleural surface adjoining the thoracic wall. Thus, segmenting the lesion from normal anatomy is a difficult task as the image differences between the lesion and normal anatomy often are not discernable in terms of voxel intensity values, e.g., Hounsfield units HU. As a consequence, region-growing tasks often expand beyond the target and, in the case of segmenting lesions, include regions that are normal anatomy.

In addition, many pulmonary nodules are either part-solid, composed of a solid center surrounded by a diffuse cloud or are non-solid. It is often desirable to be able to quantify the proportion of solid and non-solid components in the nodules. The choice of the Hounsfield unit threshold used for segmenting theses types of nodule is a crucial parameter. Too high a threshold leads to an under segmentation of the nodule and an underestimation of the nodule's volume. As the Hounsfield threshold is lowered the number and complexity of attached vessels increases and the nodule can become attached to other structures. As a result it is harder to segment the nodule from the normal anatomy and consequently more sophisticated segmentation algorithms are required.

One problem with known volumetric segmentation methods is the tendency to include part of the normal anatomy with the detected nodule, because of an inability to distinguish between the two. As mentioned before using a low enough Hounsfield threshold to capture the non-solid component of a nodule exacerbates this problem. To avoid this consequence many methods use Hounsfield threshold suitable for segmenting only the solid component. Thus there is a need for a volumetric segmentation method that can segment both the solid and non-solid components of a nodule.

Another problem with known volumetric segmentation methods stems from the use of Hounsfield thresholds to distinguish between target structures such as, for example, nodules or lesions, and anatomical structures such as, for example, local pulmonary vasculature or the pleural surface adjoining the thoracic wall. The difference, in Hounsfield units, between a target structure and a surrounding anatomical structure is very small. Thus, when segmenting a target structure disposed proximate an anatomical structure, a relatively high Hounsfield threshold must be used to distinguish between the target structure and the anatomical structure. Segmenting at such a relatively high threshold, however, may not allow a specialist to determine the full extent of the target structure. Similarly, although a relatively low Hounsfield threshold can be used to determine a greater extent of the target structure, segmenting at such a relatively low threshold may not allow a specialist to distinguish between the target structure and the surrounding anatomical structure.

It is the object of the presence invention to provide an improved volumetric segmentation method for nodules from a three-dimensional volume data. By providing the user with a plurality of conservative to aggressive volumetric segmentations that progressively includes more non-solid component. The present invention approaches this problem by using a multi-growth stage segmentation process.

SUMMARY OF THE INVENTION

It is an object of the present invention to effectively segment an anatomical structure, such as a pulmonary lesion, from the background tissue in a volumetric medical image.

The present invention has an advantage of distinguishing a variety of different anatomical structures within the context of a region growing image segmentation algorithm. In particular, the present invention can distinguish between the structures of pulmonary lesions, pulmonary lesion speculations, blood vessels, and normal solid tissues such as the chest wall or heart.

In an exemplary embodiment of the present disclosure, a method of image segmentation includes receiving a set of voxels, segmenting the set of voxels into a foreground group and a background group, and classifying voxels of the foreground group as either lesion voxels or normal anatomy voxels. The method also includes blocking the normal anatomy voxels and performing a second segmentation on voxels of the background group and the lesion voxels, the second segmentation forming a stage two foreground group comprising the lesion voxels and a portion of the voxels of the background group. The method further includes classifying voxels of the stage two foreground group as either stage two lesion voxels or stage two normal anatomy voxels.

In another exemplary embodiment of the present disclosure, a method of image segmentation includes receiving a set of voxels that were segmented into at least three classes by previous voxel segmentation, defining a region for a further voxel segmentation, the region excluding voxels of one of the at least three classes, and performing the further voxel segmentation within the region. The further voxel segmentation is more aggressive than the previous voxel segmentation and the further voxel segmentation separates voxels in the region into at least two of the at least three classes. The method also includes creating a composite class map based on the previous voxel segmentation and the further voxel segmentation.

In yet another exemplary embodiment of the present disclosure, a method of image segmentation includes performing a first segmentation capable of distinguishing between a first structure and a second structure but incapable of determining a full extent of the first structure. The method also includes defining a region for a second segmentation, the region excluding the second structure. The method further includes performing the second segmentation within the region, the second segmentation capable of determining a greater extent of the first structure than the first segmentation.

BRIEF DESCRIPTION OF THE DRAWINGS

FIGS. 3A and 3B are block diagrams showing the details of a multistage lesion segmenter.

FIGS. 6A and 6B depict a schematic representation of the classification of the initial segmentation phase results of FIG. 5A and its resulting composite class map.

DETAILED DESCRIPTION OF THE INVENTION

Figure 1:
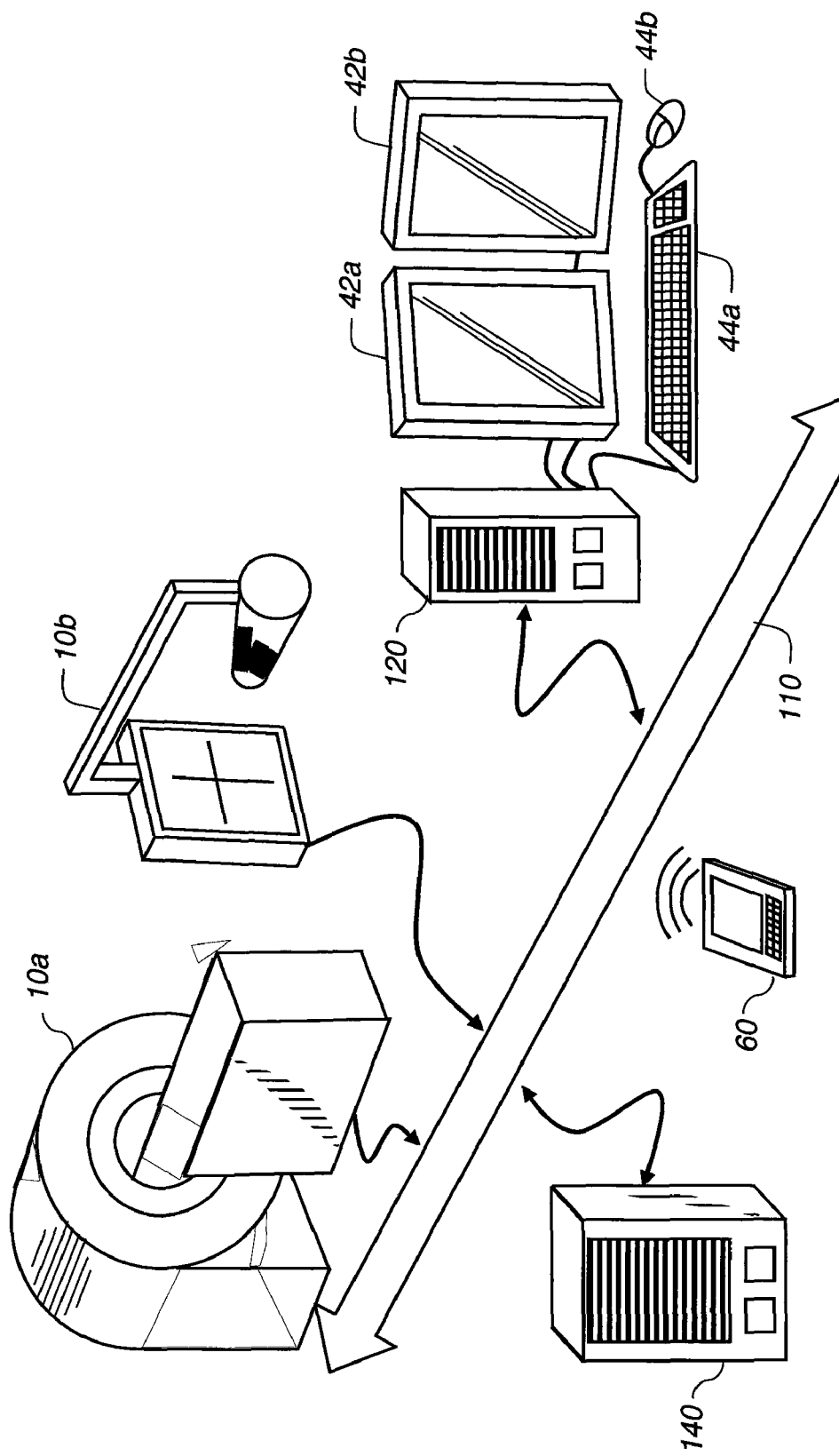
FIG. 1 is a diagram showing a medical imaging communications network of connected computers suitable for practicing the present invention.

The current invention will be elucidated in the context of segmenting a pulmonary lesion, in particular for the cases where the pulmonary lesion is attached to normal anatomy such as the local pulmonary vasculature and the pleural surface. The current invention can be applied to segmenting any anatomical structure that is attached to other anatomical structures where the image differences between the anatomical structures are not readily discernable in terms of voxel intensity values.

Many medical imaging applications are implemented via a picture archiving and communications systems (PACS). These systems provide a means for displaying digital images acquired by a wide variety of medical imaging modalities such as, but not limited to, projection radiography (x-ray images), computed tomography (CT images), ultrasound (US images), and magnetic resonance (MR images). Each of the above mentioned medical imaging modalities contain a slightly different set of diagnostic information. In particular, CT and MR images can reveal much detail about a patient's 3-dimensional internal anatomy. Computer algorithm technology can also be applied to medical images to enhance the rendering of the diagnostic information, to detect an abnormal condition, i.e. computer aided detection (CAD), and to make measurements relating to the patient's condition, i.e. computer aided measurement (CAM).

The present invention represents an algorithmic computer method for segmenting a portion of a medical image with anatomical relevance. In particular, the primary motivation for the development of the technology described herein is the segmentation of abnormal pulmonary lesion tissue from normal pulmonary tissue. An intended use for the herein described technology is as follows. A radiologist reviews a thoracic CT exam on a medical PACS and indicates to the CAM segmentation software the position of a suspected pulmonary lesion. The voxel position indicated represents a seed point assumed to be part of the pulmonary lesion. The CAM segmentation software then identifies the voxels surrounding and contiguous with the seed point that are also associated with the pulmonary lesion. Once the region associated with the pulmonary lesion has been segmented a corresponding volumetric size can be calculated. The technology advancement of the present invention relates to the particular method of performing the image segmentation task. For the purpose of the description herein, the terms lesion and nodule are synonymous and should be considered interchangeable.

In the following description, a preferred embodiment of the present invention will be described as a software program. Those skilled in the art will readily recognize that the equivalent of such software may also be constructed in hardware. Since image processing and manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

A system suitable for practicing the present invention is illustrated in FIG. 1 showing a medical imaging communications network that includes multiple connected computers. Such a network of computers provides a means of sending and receiving information between any two or more connected computers. The image capture device 10a symbolically represents a number of medical digital image modality devices such as, but not limited to, a computed tomography scanning device (CT) or magnetic resonance imaging scanning device (MR) that is capable of producing 3-dimensional digital images of patient anatomy. The 3-dimensional digital images are typically composed of a series of cross-sectional, or slice, images through the patient anatomy.

Also connected to the communications network 110 is a digital radiographic (DR) capture device 10b capable of producing digital x-ray images. As such, the images produced by a DR capture device typically are one or more 2-dimensional digital images each representing a different exposure and or imaging path through the patient. For example, the DR capture device 10b can be used to acquire multiple projection radiographic digital images with its x-ray source located in different positions relative to the patient. The resulting DR radiographic digital images can be processed to produce a set of slice digital images that represent a 3-dimensional digital image of the patient.

The slice digital images (not shown) produced by the capture device 10a are transmitted via the communications network 110 to a image archive computer 140 where, along with patient history information, they become part of an electronic patient history record. The main function performed by the image archive computer 140 is the facilitation of transfer or exchange of image information rather than the processing of information. The image archive computer 140 serves as a large storage repository of digital images and other medical information. The arrows in the diagram of FIG. 1 represent the exchange of information, which in general, is bi-directional, i.e. the flow of information can be in either direction.

The slice images are later queried on a diagnostic workstation computer 120, sometimes referred to as a picture archive and communication system (PACS), for viewing and examination by a radiologist or similarly trained medical professional. The diagnostic workstation computer 120 can have multiple electronic displays connected for viewing medical images. Two such electronic display devices 42a and 42b are shown in FIG. 1. Also connected to the diagnostic workstation computer 120 are input devices 44a and 44b depicted here as keyboard and mouse devices respectively. Although the technology of the present invention was envisioned as operating within the context of a diagnostic workstation computer, it should be noted that any computing device capable of displaying and processing image data could be used. In particular, a mobile computer 60 shown in FIG. 1 can be used with the present invention. Thus, it is not necessary for the computer to be physically connected to the communications network 110.

A PACS can be defined as a system that acquires, transmits, stores, retrieves, and displays digital images and related patient information from a variety of imaging sources and communicates the information over a network. By this definition, the diagnostic workstation computer 120 shown in FIG. 1 can represent a PACS. Similarly, the combination of the diagnostic workstation computer 120, mobile computer 60, image archive computer 140, and communication network 110 can collectively be considered a PACS. In addition to the patient digital images, PACS transmit, receive, and store other electronic patient record information such as, but is not limited to, non-image information (meta-data) such as age, sex, medical history, prescribed medications, symptoms, etc.

For the purposes of the discussion of the present invention the collection of inter-connected computers including the communications network will be also be referred to as a DICOM network since DICOM formatted digital images are currently the most prevalent file encoding used for medical digital images. Typically a 3-dimensional volume image is constructed from set of 2-dimensional slice digital images wherein each slice digital image is encoded as an individual DICOM file.

Often an individual image data element, i.e. single value representing signal intensity at a point or small region, is referred to as a voxel for 3-dimensional images and a pixel for 2-dimensional images. The term voxel is commonly used to characterize a volume-element whereas the term pixel is commonly used to characterize a picture-element. The technology embodied within the present invention can be applied to 2-dimensional and 3-dimensional images. As such, for the purposes of the description herein, the terms voxel and pixel should be considered interchangeable, i.e. describing an image elemental datum capable of having a range of numerical values. Voxel and pixels can be said to have the attributes both of location and value. In particular, the term voxel should be interpreted to include a number of pixels, that is, a pixel is a voxel having a thickness of zero (i.e., a 2-dimensional voxel).

With the medical imaging system setup as described above and shown in FIG. 1, a medical professional such as a radiologist (not shown), uses the keyboard 44a or mouse 44b to indicate to the software application program 150 (shown in FIG. 2), running on the diagnostic workstation computer 120, the desired patient record (not shown) to be loaded into memory. The CT digital image exam, i.e. the set of CT slice digital images, is then retrieved from the image archive computer 140 and displayed on the electronic display devices 42a and/or 42b. After viewing the image data, the medical professional indicates to the system the location of a suspected pulmonary lesion with a click of the mouse, input device 44b. Typically this is performed by sequentially scrolling through the 2-dimensional slice images and viewing the slice digital image that best shows the suspected pulmonary lesion.

Figure 2:
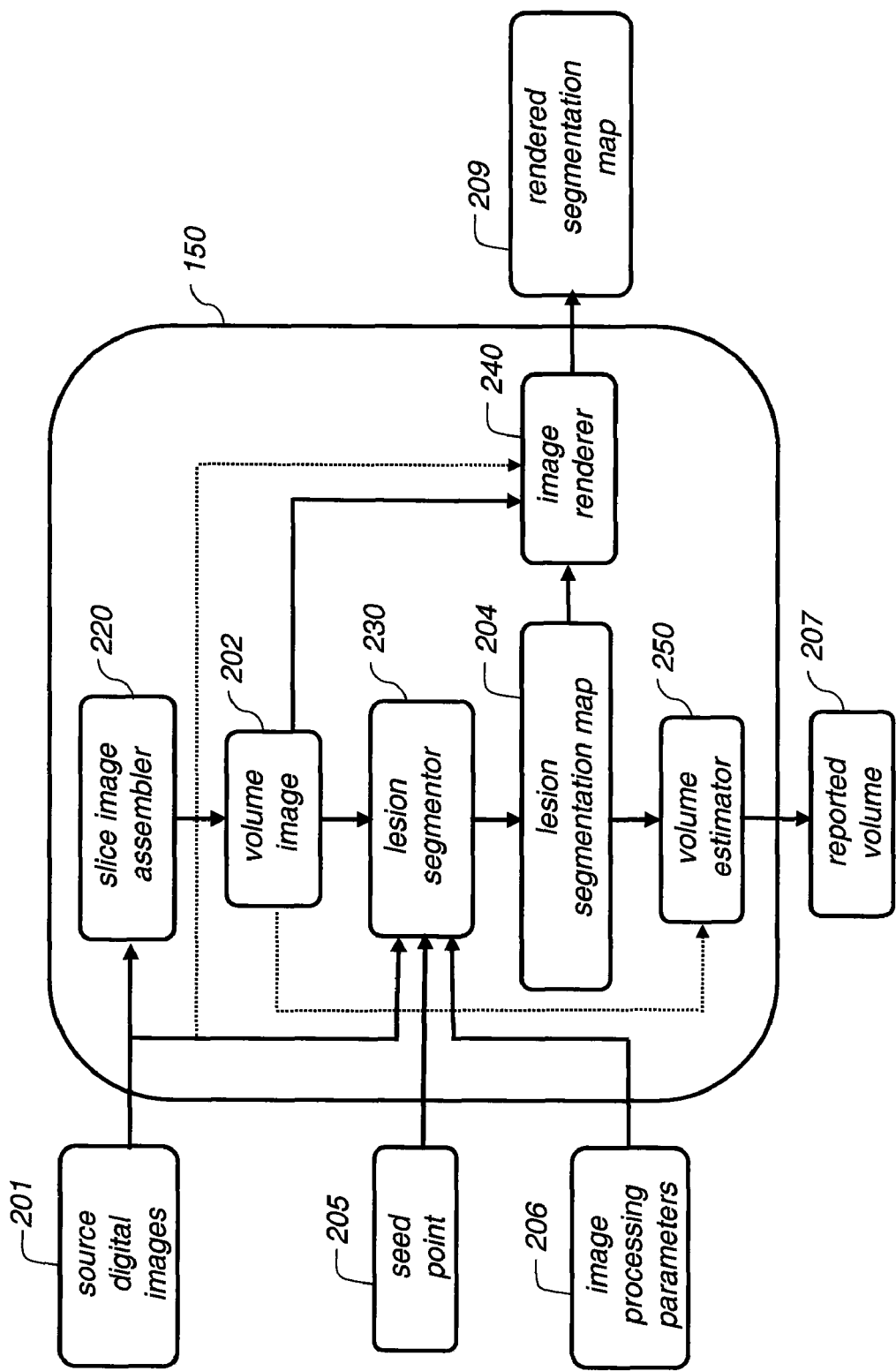
FIG. 2 is block diagram showing the details of a software program running within a diagnostic workstation computer.

A brief overview of the flow of image information into, out of, and within segmentation application program, referred to as the "segmenter" 150 is depicted by FIG. 2. The segmenter 150 receives a set of source digital images 201, a seed point 205, and image processing parameters 206 and produces a reported volume 207, a segmentation map 204, and alternatively, a rendered segmentation map 209, using image renderer 240. Within the segmenter 150, the following analysis and processing is performed. The slice image assembler 220 receives the multiple images as the set of source digital images 201 and generates a volume image 202. The volume image 202, the image processing parameters 206, and the seed point 205 are then passed to the lesion segmenter 230, image renderer 240, and volume estimator 250. The volume image 202 provides imaging voxel data regarding the 3-dimensional nature of the patient anatomy. The image processing parameters 206 contain multiple data items that regulate, or control, the actions of the lesion segmenter 230. The seed point 205 communicates location of a suspected pulmonary lesion. The lesion segmenter 230 generates a segmentation map 204, i.e. volume image data that indicates, on a voxel by voxel basis, the segmentation classification information as to whether or not each voxel is considered part of the segmented lesion or another anatomical structure.

Pulmonary nodules are categorized into three groups according to the nodule opacity (or density) characteristics: solid nodule, semisolid nodule and nonsolid (or ground glass opacity) nodule. A nodule is classified as solid if it completely obscures the lung parenchyma, semi-solid if it has patches within it that completely obscures the lung parenchyma, and non-solid if none of the lung parenchyma in it is completely obscured. Typically semisolid nodules are composed of a solid center surrounded by a diffuse nonsolid region, whereas nonsolid nodules have a non-uniform structure and variable appearance. The nodules are further categorized by their attachment to normal anatomy: isolated with no attachment to normal anatomy, attached to blood vessels (vascularized), and attached to the surfaces of the lung (juxta-pleural and juxta-mediastinum).

Figure 4B:
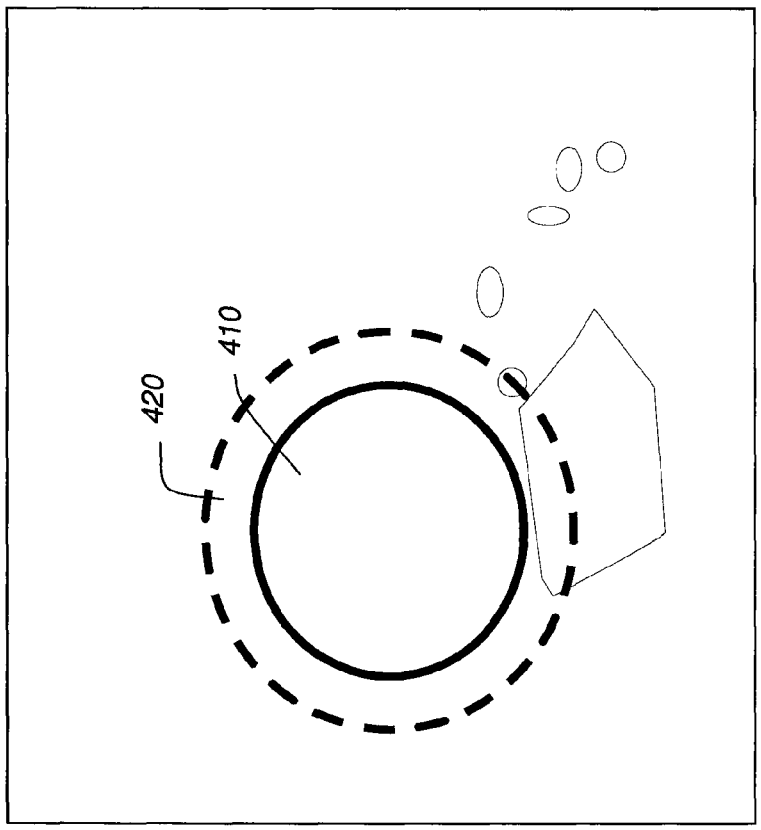
FIGS. 4A and 4B depict a schematic representation of a lesion and its idealized segmentation.
Figure 4A:
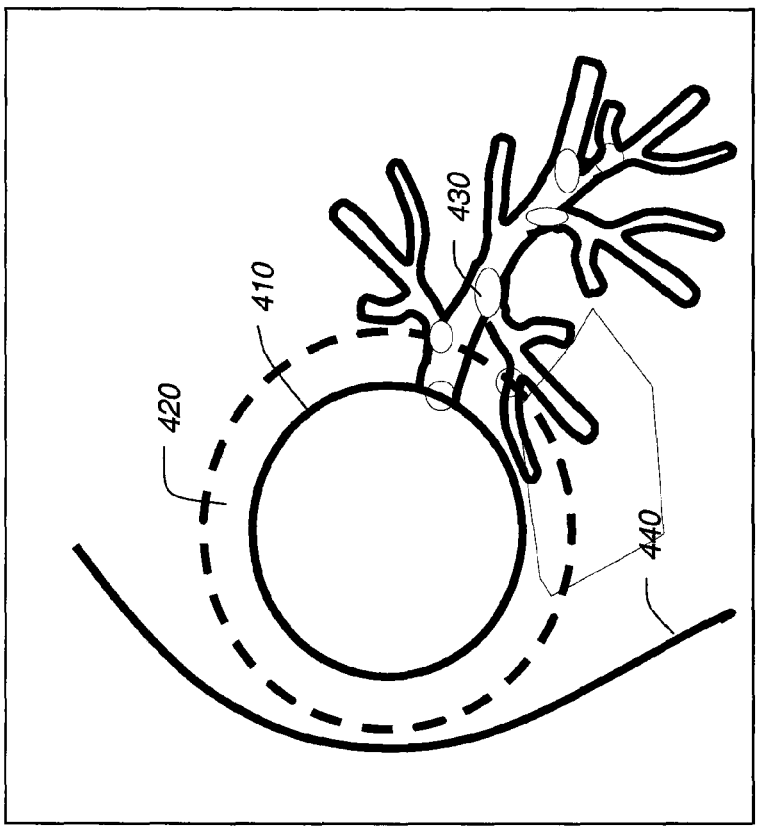

The objective of the segmentation process is to identify both the solid and non-solid portions of the lesion while minimizing the inclusion of normal anatomy. The presence of nearby vessels and pleural surfaces, which have attenuation values similar to those of nodules, can complicate the segmentation of nodules from the surrounding lung, thereby resulting in inaccurate measurement of nodule volume. FIG. 4A shows a schematic 2-dimensional representation of a vascularized semisolid nodule useful for detailing the current invention and problems with the known art. The nodule is composed of a solid center 410 surrounded by a diffuse nonsolid region 420 and an attached vessel 430. The nodule is also in close proximity to the pleural surface 440 but not attached to it. The desired segmentation results for this nodule are shown in FIG. 4B. Ideally, the nodule segmentation method should be capable of the segmenting the lesion into approximately a solid 910 and nonsolid 920 region while not including the vessel in the final nodule segmentation.

Without loss of generality, the schematic representation of the nodule and associated nodule segmentations represent two-dimensional embodiment. One skilled in the art will realize that the above representation can be extended to three dimensions.

Most current nodule segmentation algorithms are performed using region growing techniques, morphological watershed transformations, level sets and fast marching techniques. Nodule segmentation algorithms usually are composed of an initial segmentation phase that segments both the nodule and normal anatomy into one object (i.e. the foreground) followed by a normal anatomy pruning/classification phase that separates the normal anatomy from the nodule. The output of the nodule segmentation is segmentation class map that assigns a class (nodule, vessels, pleural wall, background, etc) to each voxels location.

Examples of segmentations techniques useful for performing the initial segmentation phase are: thresholding, region growing techniques, morphological watershed transformations, level sets and fast marching techniques, and etc (see D. L. Pham, et. al., "A Survey of Current Methods in Medical Image Segmentation", in Annual Review of Biomedical Engineering, Volume 2, eds. M. L. Yarmush, K. R. Diller, and M. Toner, Annual Reviews, pp. 315-337, 2000 and O. Wirjad. "Survey of 3d image segmentation methods," Technical report No. 123, Fraunhofer ITWM, Kaiserslautern, Germany, 2007).

Examples of techniques for normal anatomy pruning are: morphological processing (see Jan-Martin Kuhnigk, et. al., "Morphological Segmentation and Partial Volume Analysis for Volumetry of Solid Pulmonary Lesions in Thoracic CT scans," IEEE Transactions on Medical Imaging, Vol. 25, No. 4, April 2006, pp 417-434), template based (see L. Fan, et. al., "Realtime interactive segmentation of pulmonary nodules with control parameters", U.S. Pat. No. 6,993,174 B2), and segmentation front analysis (see below).

The stopping conditions of the initial segmentation phase can be used to control the spatial extent and the amount of solid and nonsolid region included in the segmented nodule. Stopping conditions are cast as functions of the image properties (intensity, gradient, intensity statistics) and the segmented object's boundary (curvature). For example reducing the threshold for an initial segmentation phase, which uses a Hounsfield threshold as a stopping condition, will result in the greater inclusion of the nonsolid region in the segmented nodule. Unfortunately, known nodule segmentation methods often fail to produce the desirable results especially when trying to segment both the solid and nonsolid portions of the nodule. As the initial segmentation phase tries to segment the nonsolid region it tends to include a greater portion of the normal anatomy. As a result it is harder for the pruning/classification phase to separate the nodule from the normal anatomy and consequently more sophisticated algorithms are required.

Figure 5B:
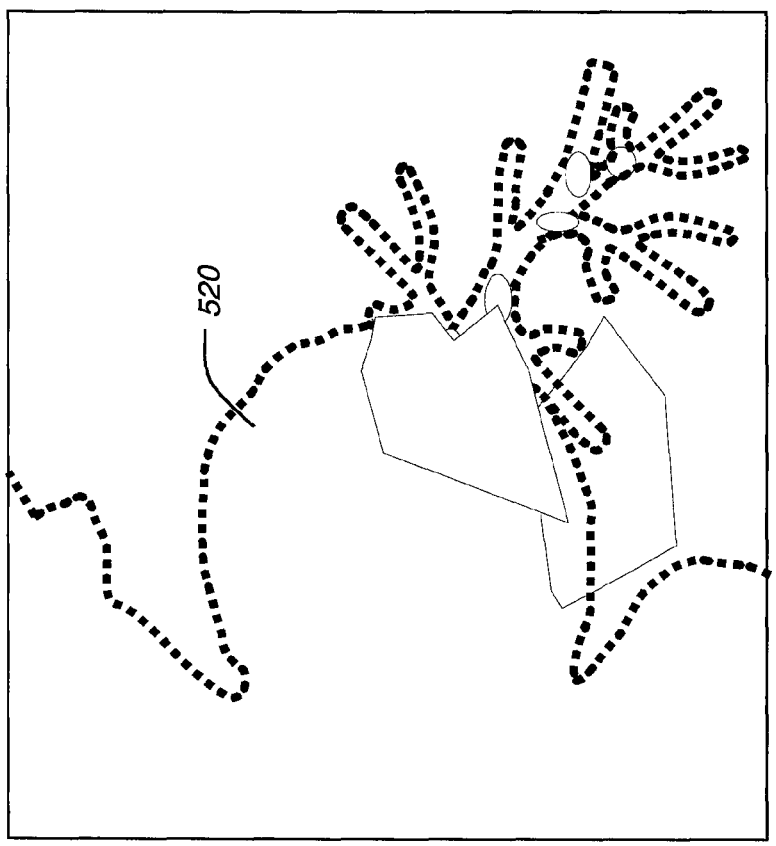
FIGS. 5A and 5B depict a schematic representation of initial segmentation phase results for the lesion in FIG. 4A.
Figure 5A:
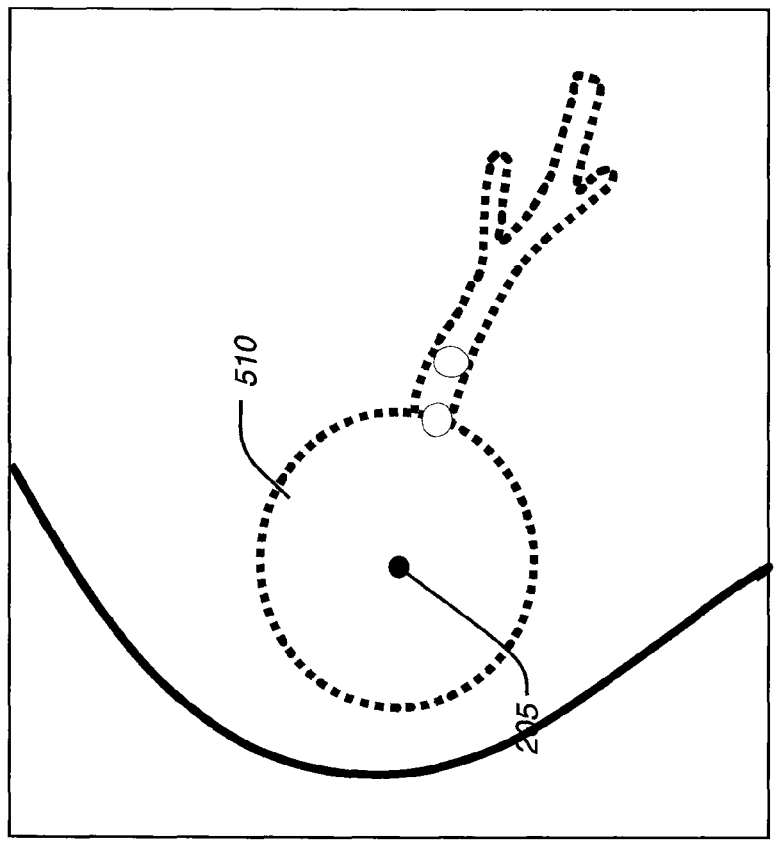

To schematically illustrate the problems mentioned above, FIGS. 5A and 5B show the initial segmentation phase results at two different thresholds for the nodule shown in FIG. 4A. A threshold appropriate for segmenting the solid region of the nodule is used in FIG. 5A whereas a lower threshold more suitable for segmenting both the solid and nonsolid regions is used for FIG. 5B. Referring to FIGS. 5A and 5B as the Hounsfield threshold is lowered the resulting nodule segmentation attaches to and spreads along the boundary of the pleural wall plus the complexity of attached vessels increases. The connection and spreading of nodule segmentation to the pleural wall occurs when nodules are in close proximity to the pleural. This resulting effect is due to partial volume effects and other low attenuation pulmonary features such as atelectasis, pleural effusion, etc. As mentioned before using a low enough Hounsfield thresholds to capture the non-solid component of a nodule exacerbate the pruning/classification phase ability to unambiguously and robustly delineate the boundaries between the nodule and pleural wall and between nodule and vessel. To avoid this consequence many known nodule segmentation algorithms use parameters suitable for segmenting only the solid component.

To overcome the above stated problems, the present invention uses a multistage segmentation process designed to sequentially grow the nodule in a controlled manner to enable the robust segmentation and classification of the nodule and attached normal anatomy. It is understood that the nodules, lesions, and other malignant growths discussed herein may be referred to as "target structures" and the pleural wall, vessels, and other normal anatomy discussed herein may be referred to as "anatomical structures." Each stage of the multi-growth stage segmentation method can have a specific segmentation goal. Additionally, each subsequent stage uses the segmentation results from previous stages to improve the overall segmentation of the nodule. A preferred (and perhaps different) segmentation algorithm and the associated stopping conditions can be chosen for each stage.

In a preferred embodiment of the current invention, the goal of the first segmentation stage is to identify and classify the solid or central portion of the nodule and any normal anatomy (vessels and pleural wall/mediastinum) that is attached to the nodule. Subsequent growth stages are primarily for identifying the semisolid portion of the lesion that surrounds the solid portion while further identifying attached vessels.

In a preferred embodiment a wave front segmentation process is used in each stage to segment and classify the nodule and attached normal anatomy. The growth of the nodule is controlled, by lowering the threshold of each subsequent segmentation stage, to ensure the robust identification of attached normal anatomy.

For the purposes of the description herein, the term aggressive as applied to the initial segmentation phase should be considered to indicate the ability of the initial segmentation phase to control the spatial extent and the amount of solid and nonsolid region included in the segmented nodule. If the same segmentation algorithm is use for the initial segmentation phase for each stage then the term aggressive applies to choosing a cost function that allows a greater portion of the nodule to be included in the segmentation. One skilled in the art will recognize that there are many different segmentation algorithms and stopping conditions besides the ones mention above that can be utilized in the initial segmentation phase of the current invention.

The details of an embodiment of a lesion segmenter 230 based on a multistage growth process are depicted in FIGS. 3A and b. The lesion segmenter 230 receives the volume image 202, seed point 205 and image processing parameters 206 as input and produces a lesion segmentation map 204. The image processing parameters 206 are a set of control parameters used to regulate the overall segmentation processing. The seed point(s) 205 indicates one or more (x, y, z) locations (typically as a set of i, j, k indices) or a boundary contour within the suspected pulmonary lesion. It is about this these locations that lesion segmenter 230 performs the segmentation process. The image processing parameters 206 contain multiple data items that regulate, or control, the actions of the multistage growth segmenter 230. For multistage growth the number of growth stages and the range and type of stopping conditions are examples of image processing parameters. For example, the range of thresholds can be determined either by analyzing traces of the voxel values that originate at the seed point and extend in different directions through the nodule to the lung parenchyma or by histogram analysis of voxel values in a bounding volume about the seed point that is large enough to include both the nodule and lung parenchyma.

In the determine segmentation "stage m" segmentation parameter step 310, the segmentation algorithm and stopping conditions are set along with the "stage m-1" composite segmentation class map that contains the results of the previous segmentation stages. The composite segmentation class map contains for each voxel the class it has been assigned to (nodule, vessels, pleural wall, background, etc) and the stage in which it was segmented. In addition, a voxels can be classified as blocked if they are adjacent to (or in the neighborhood of) either classified normal anatomy voxels or an unclassified voxels (i.e. background voxels) that are above the current threshold. The blocked voxels are used to prevent the current stage m segmentation from creeping or spreading along previously identified anatomy. For the first segmentation the voxels in composite class map are initialized to background.

In "stage m" nodule segmentation step 320, the "stage m" nodule segmentation is executed using the prior information contained in the composite class map to guide the initial segmentation phase 322. The initial segmentation phase is then followed by a normal anatomy pruning/classification phase 324 that classifies the current segmentation results. The initial segmentation phase 322 can start from a seed point within the nodule or from the boundary of the current nodule segmentation. Starting from a seed point for stages after the first stage will result in resegmenting some of the already segmented parts of the nodule but at a more aggressive setting of the cost function (e.g. a lower threshold). If initial segmentation phase 322 starts from a seed point it can use either the original seed point 205 or use a new seed point derived from the current composite class map. Examples of useful new seed point are the center of mass or the location of the voxel that is the furthest distance from the boundary of the current nodule segmentation. The current nodule segmentation corresponds to voxels classified as nodule in the current composite class map. The composite class map is used by the current initial segmentation phase 322 to prevent/block the segmentation phase from regrowing and spreading around regions already identified as normal anatomy.

In the generate "stage m" composite class map 330, the class map of the current "stage m" and the "stage m-1" composite class map are combined to generate the "stage m" composite class map. Segmented voxels that have not been previously segmented and classified are added to the composite class map. It is also necessary to rectify conflicting voxel classifications. It is possible that a voxel previously segmented and assigned to a given class (e.g. nodule) will be segmented and assigned to a different class (e.g. vessel) by the current segmentation stage. During the early stages of the nodule multistage growth process it may not be possible for the pruning/classification phase algorithms to determine if a segmented voxel is part of a nodule or a vessel that might form as the multistage growth process continues. Consequently, in the case of conflicting voxel classifications the voxels in the composite class map are assigned the most recent classification contained in the current class map. Next blocked vessels are identified. Voxels adjacent to (or in the neighborhood of) either identified normal anatomy voxels or unclassified voxels (i.e. background voxels) that are above the current threshold are classified as blocked.

In the another segmentation stage step 340, it is determined if there a more segmentation stages to execute. If there are more stages to execute the stage index is incremented and control is passed back to step 810 to start the next segmentation stage. If the final segmentation stage has been executed the nodule segmenter 230 produces, on output, a final segmentation map 204 that can be used by volume estimator 250 and by the nodule image render 240. The final stage composite class map represents the final segmentation map 204. The outputs of the volume estimator 250, the reported volume 207, and image render 240, the rendered segmentation map 209, are displayed on the electronic display devices 42a and 42b enabling the practitioner to review the results of the CAM segmentation software.

The current invention will be further elucidated with a schematic illustration of a two-stage embodiment in the context of the nodule in FIG. 4A. FIG. 5A shows the stage one initial segmentation phase 322 results using a threshold appropriate for segmenting the solid region. The resulting segmented voxels 510 encompasses both the nodule and an attached vessel. The segmentation results are passed to the pruning/classification phase 324, which classifies the segmented voxels 510 into vessel 620 and nodule 610 voxels (see FIG. 6A). The voxels 640 adjacent to the pleural wall 440, which are above the current threshold, are classified as blocked along with the voxels 630 that are adjacent to the classified vessel 620. The stage one composite class map at this point is composed of voxels 610 classified as nodule, voxels 620 classified as vessel, voxels 630 and 640 classified as blocked, and the remaining voxels are classified as background (see FIG. 6B).

Figure 7:
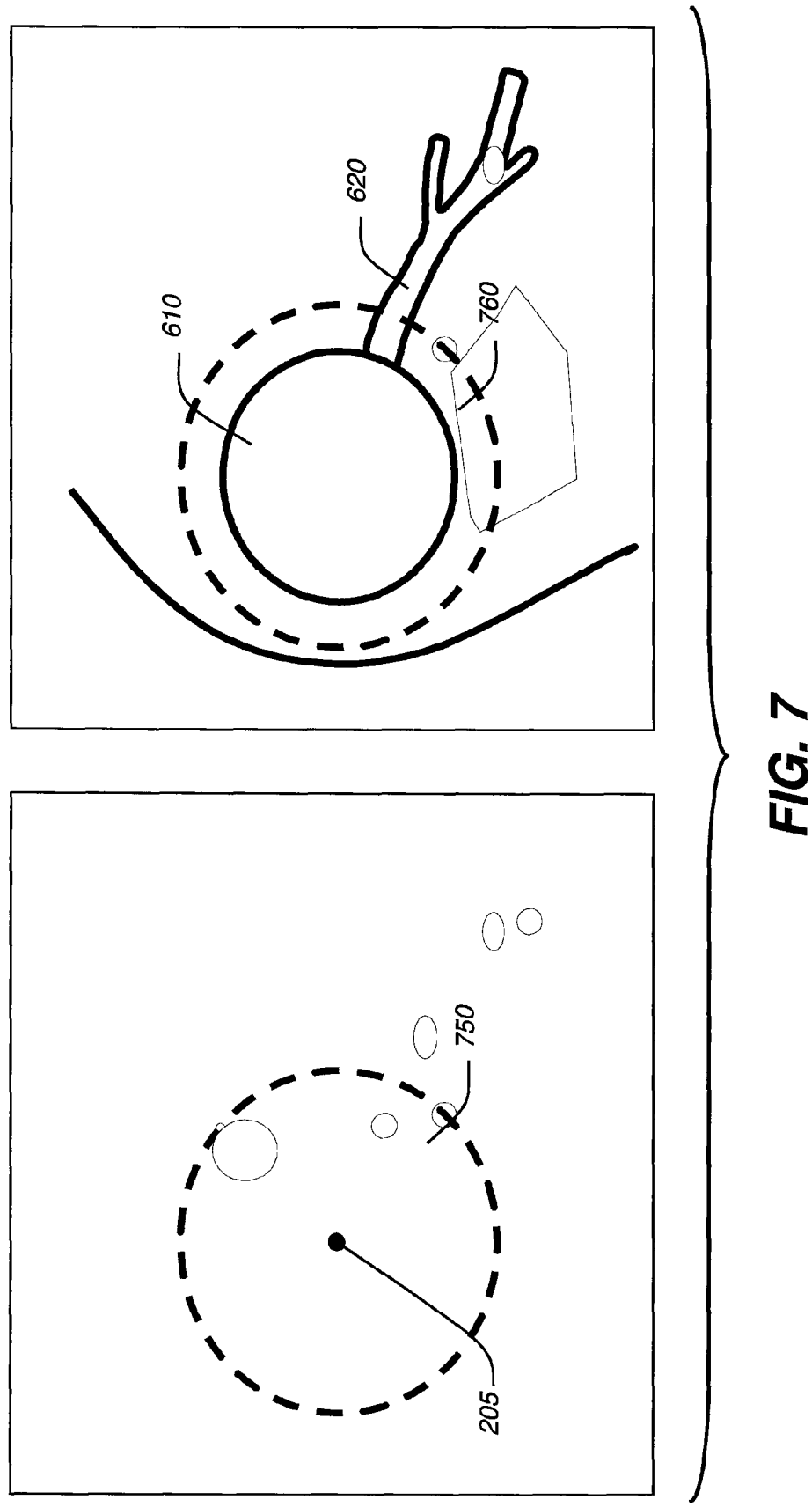
FIG. 7A depicts a schematic representation of initial segmentation phase results using the composite map of FIG. 5B.
FIG. 7B depicts a final segmentation and classification of the lesion in FIG. 4A.

The stage two nodule segmentation regrows the nodule, starting from seed point 205, using a threshold lower than stage one so as to include both the solid and nonsolid portion of the nodule. The stage one composite class map is to guide the regrowth process. The resulting segmented voxels 750 for the stage two initial segmentation are composed exclusively of nodule voxels (see FIG. 7A). The information in the composite class map prevented the segmentation from connecting to the pleural wall and from regrowing and increasing the complexity of attached vessel. If the composite class map was not taken into account the resulting stage two segmented voxels 520 would encompass the pleural wall and a complex vessel segment (see FIG. 5B), making it very challenging to accurately separate the nodule from the pleural wall and vessel. The stage two composite class, which results from combining the current stage class map with the stage one composite class map, is composed of voxels 610 classified as stage one nodule voxels, voxels 760 classified as stage two nodule voxels, and voxels 620 classified as stage one vessel voxels. The stage two composite class map represents the final segmentation map 204.

The reported volume 207, calculated by the volume estimator 250, can be determined by a weighted summation of the volume of the individual segmented voxels that compose the nodule. The weights on individual voxels can be used to take in account partial volume effects that arise when a voxel contains more than one tissue type (see Jan-Martin Kuhnigk, et. al., "Morphological Segmentation and Partial Volume Analysis for Volumetry of Solid Pulmonary Lesions in Thoracic CT scans," IEEE Transactions on Medical Imaging, Vol. 25, No. 4, April 2006, pp 417-434). Using the stage associated with each classified nodule voxel in the final segmentation class map, the volume estimator can calculate the total $vT_i$ and differential $vD_i$ volumes for each stage (i=1 ... n). The differential volume for stage i is the volume enclosed between the boundaries of stages i and i-1 and the total volume for stage i is the volume enclosed by the boundaries of stage i.

The rendering of the final segmentation class map 209 by the image render 240 can be in the form of a 3-dimensional surface or volume and/or as a boundary contour plotted on the 2-dimensional slice data (axial, coronal, sagittal planes). The segmentation results for each stage can be displayed either concurrently or for a given stage specified by the practitioner. The segmentation results can concurrently be rendered in a 3-dimensional volume form by assigning progressively higher opacities to voxels segmented in earlier stages and in a 2-dimensional form by displaying the contour boundaries for each stage simultaneously on the 2-dimensional slice data. Alternatively, the segmentation results for a given stage specified by the practitioner can be rendered in a 3 dimensional polygon surface enclosing total volume and/or in a 2 dimensional form by displaying the contour boundary that encloses the total volume for the given stage.

Figure 8:
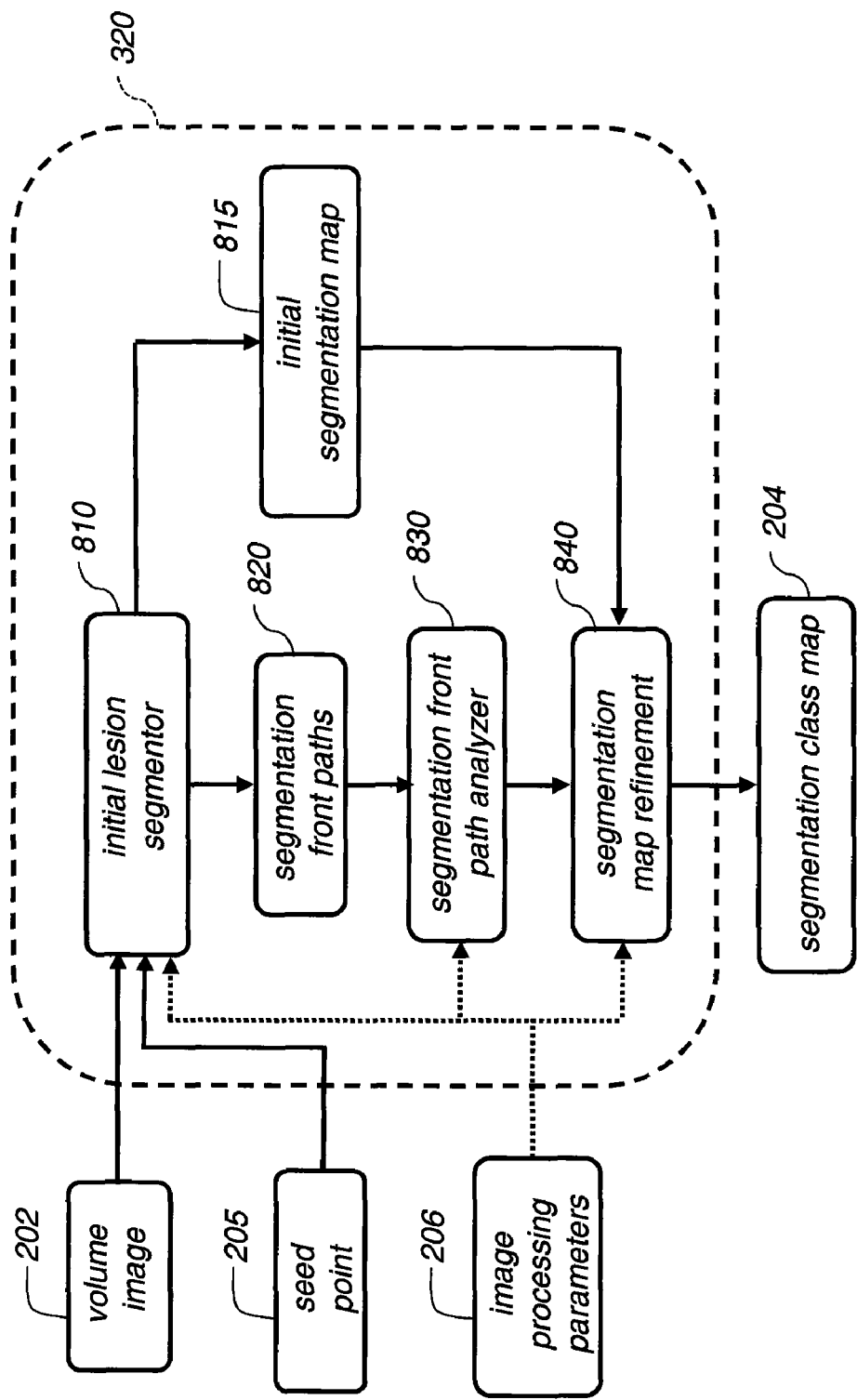
FIG. 8 is block diagram showing the details of a wave front-based lesion segmenter.

In a preferred embodiment of the current invention a segmentation front analysis is used to perform the stage m nodule segmentation step 320. The details of the segmentation front analysis are depicted in more detail in FIG. 8. The lesion segmenter 810 produces, on output, a final segmentation map 204 that represents the voxels identified as part of the pulmonary lesion, spiculated tentacle's of the lesion, vessels, normal anatomy (lung wall, mediastinum, etc), background (lung parenchyma). The initial lesion segmenter 810 receives the volume image 202, seed point 205 and image processing parameters 206 as input and produces segmentation front paths 820 and the initial segmentation map 815. The image processing parameters 206 are a set of control parameters used to regulate the overall segmentation processing. The seed point 205 indicates a (x, y, z) location (typically as a set of i, j, k indices) of a suspected pulmonary lesion within the volume image 202. It is about this voxel location that the initial lesion segmenter 810 performs a first segmentation process. The initial segmentation map 815 represents a first-attempt classification of voxels, by the initial lesion segmenter 810, for voxels classified as part of the pulmonary lesion. A segmentation front path is a collection of voxels that represent a sequential connected region-growing path that is generated as part of the region growing processing. The ensemble of segmentation front paths 820 is a catalog of all the individual segmentation front paths. The segmentation front path analyzer 830 receives the segmentation front paths 820 and classifies each individual segmentation front path as associated with a particular anatomical structure. The segmentation front path analyzer 830 classifies those voxels associated with non-lesion anatomy structures. The segmentation map refiner 840 using both the results of the segmentation front path analyzer 830 and the initial segmentation map 815 and performs further refinement of the segmentation processing. The final segmentation map 204 incorporates these refinements and identifies voxels deemed to be part of the lesion tissue and voxels that are part of non-lesion anatomy. The final segmentation map 204 corresponds to the stage m class map, which is combined with the stage m-1 composite class map to generate the stage m composite class map.

Figure 9:
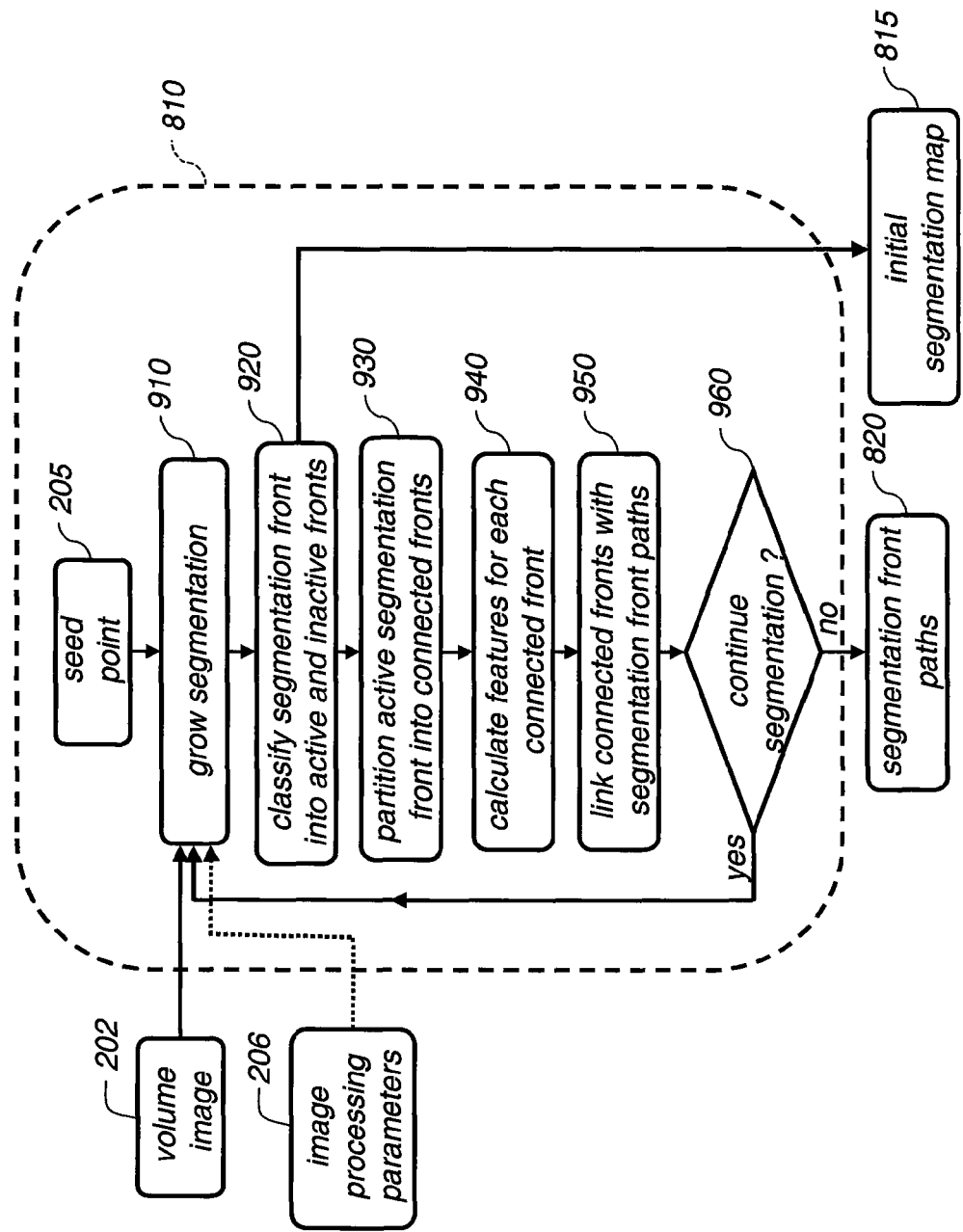
FIG. 9 is a block diagram showing the details of a wave front-based initial lesion segmenter.
Figure 10A:
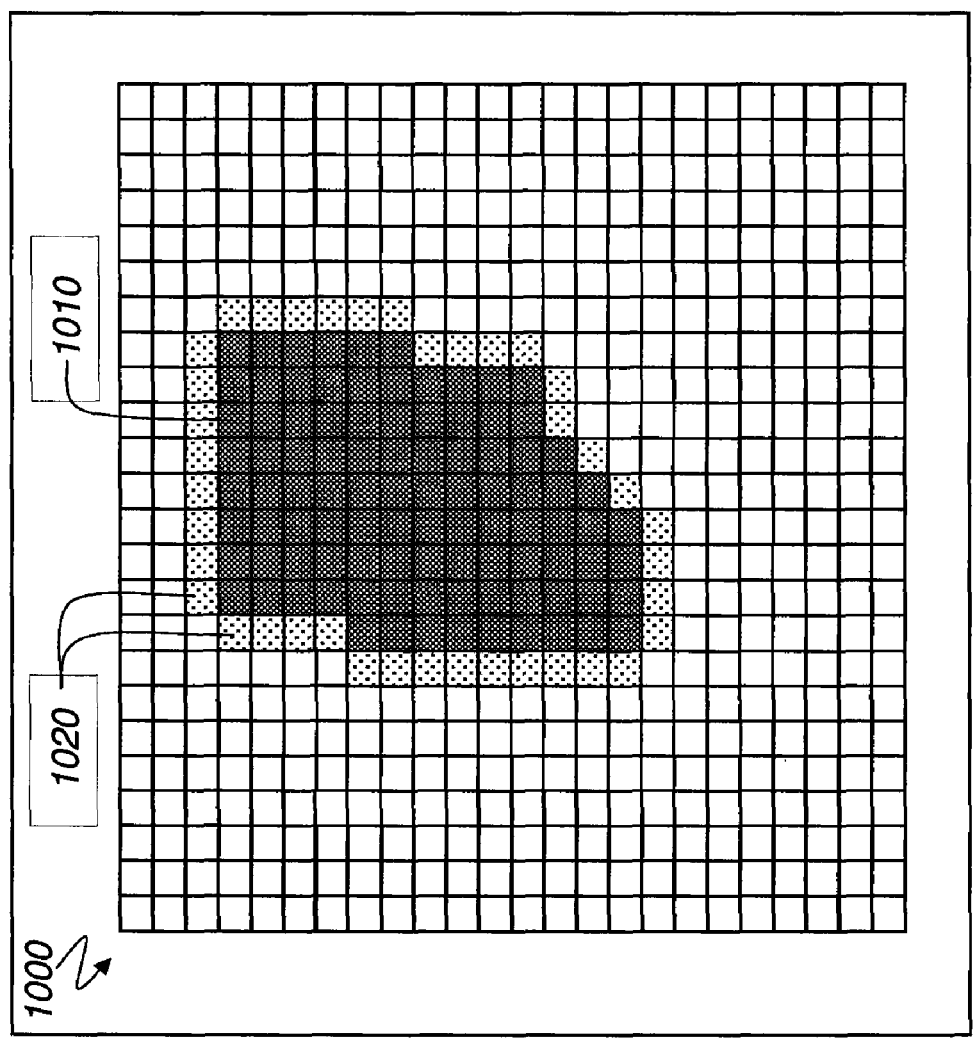
FIGS. 10A, 10B, and 10C are schematic representations of a segmentation process within an initial lesion segmenter.
Figure 10B:
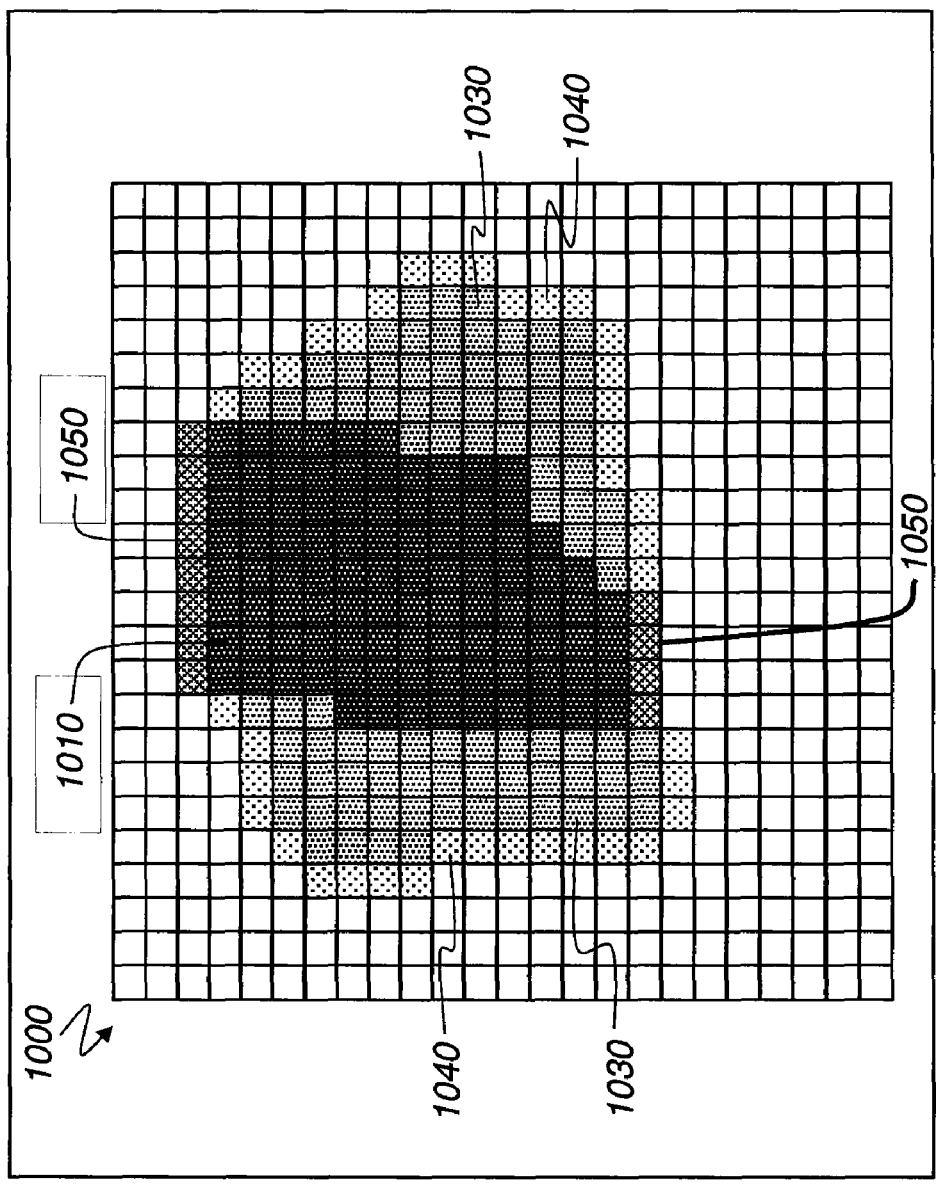
Figure 10C:
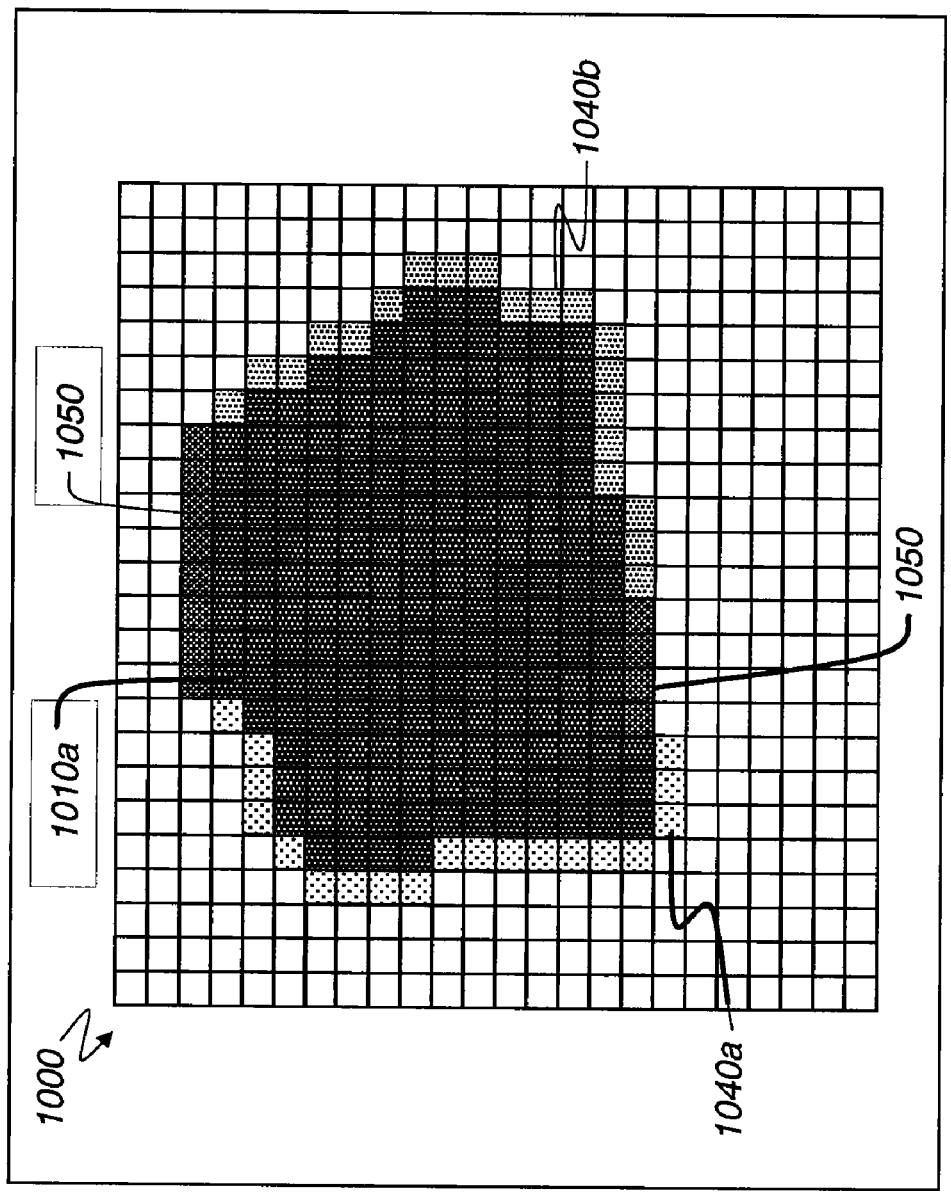
Figure 11:
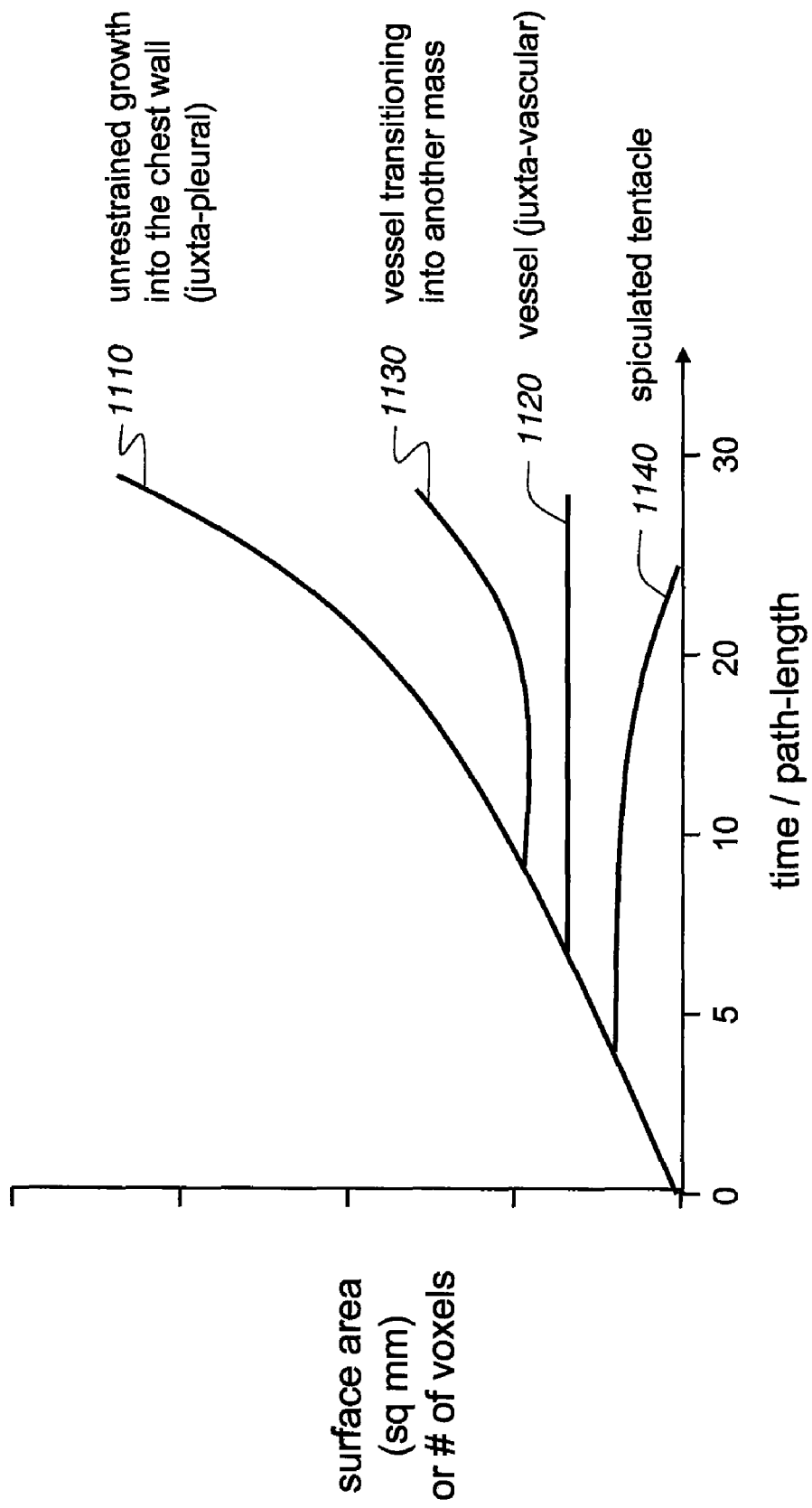
FIG. 11 shows a graph of a number of voxels as a function of path length for different idealized lesion types.

The details of a preferable initial lesion segmenter 810 are depicted in more detail in FIG. 9 and schematically in FIGS. 10A, 10B, and 10C. Without loss of generality, the schematic representation of the lesion segmenter in FIGS. 10A, 10B, and 10C represent a two-dimensional embodiment where the grid 1000 has been uniformly sampled and connectivity of four grid elements (pixels) has been assumed. One skilled in the art will realize that the above representation can be extended to three or more dimensions with different degrees of connectivity between grid elements (voxels). Upon initiation the initial lesion segmenter 810 receives the volume image 202, seed point 205, and image processing parameters 206 as input. The set of voxels 1020 on the boundary of the current segmentation map 1010 are denoted as the current segmentation front from which further growth of the segmentation can occur. Initially the set of voxels in the segmentation is the seed point 205 and is considered the first segmentation front. In the grow segmentation step 910, the segmentation region grows by adding a set of voxels 1030, according to a predefined set of rules, starting from the set of voxels 1020 on the boundary of the current segmentation map 1010. The number of voxels added to the segmentation during the grow segmentation step 910 is controlled by D1; a parameter in the image processing parameters 206. In a preferred implementation of the initial lesion segmenter 810, during the grow segmentation step 910 at a minimum every voxel on the boundary of the current segmentation 1010 is used to grow the segmentation region. The set of voxels 1030 is added to the current segmentation map 1010 producing segmentation map 1010a that subsequently becomes the current segmentation map.

In the classify segmentation front into active and inactive fronts step 920, the current segmentation front is delineated and is classified into active 1040 and inactive 1050 segmentation fronts. Inactive segmentation fronts contain voxels in which no further growth of the segmentation can occur according to the segmentation criteria. Segmentation fronts that contain voxels that can initiate further growth are considered active fronts. In the partition active segmentation front into connected fronts step 930, the active segmentation front is partitioned into a set of uniquely labeled connected fronts 1040a and 1040b where all the voxels of a uniquely labeled front are connected.

In the calculate features for each connect front step 940, features for each segmentation front are computed. Features for each segmentation front k and the volume associated with each segmentation front can be computed, such as, the number of voxels $N_k$, the center of gravity (centroid) $C_k$, shape and orientation, direction between successive segmentation fronts, curvature, etc. The centroid of a wave-front part is defined as $$C_k = \frac{1}{N_k} \sum_i X_i$$

where $X_i$ is the coordinate of the ith voxel in segmentation front k. The direction between successive segmentation front is defined as $$D_k = C_{k+1} - C_k$$

and the curvature is defined as $$\kappa_k = |D_k - D_{k-1}|.$$

The shape and orientation of the kth segmentation front can be determined by the eigenvalues λ and eigenvectors u of the covariance matrix of the voxel's spatial coordinates X that makeup the kth segmentation front. The eigenvectors yield the orientation or principal axes of the front and eigenvectors yield information related to the shape of the front. For example, if eigenvalues are ordered in magnitude such that $\lambda_1 \leq \lambda_2 \leq \lambda_3$, then a front associated with a vessel is indicated by $\lambda_1$ being small (ideally zero), and $\lambda_2$ and $\lambda_3$ are of larger and similar magnitude. The respective eigenvectors $u_1$ indicates the direction along the vessel and $u_2$ and $u_3$ form the normal (orthogonal) plane.

Intensity (Hounsfield) based features, which describe the characteristics of the magnitude, shape and orientation of the local intensity distribution for each segmentation front k and the volume associated with each segmentation front can be computed. Examples of descriptors of the local intensity are the mean, maximum, minimum, etc. Examples of local shape and orientation descriptors are the Hessian matrix and structure tensor (see K. Krissian, et. al., "Multiscale Segmentation of the Aorta in 3D Ultrasound Images," in 25th Annual Int. Conf. of the IEEE Engineering in Medicine and Biology Society (EMBS). Cancun, Mexico, 2003, 638-641) and the curvature tensor (see P. Mendonca, et. al., Model-Based Analysis of Local Shape for Lesion Detection in CT Scans," Proceedings of the International Conference on Medical Image Computing and Computer-Assisted Intervention (MICCAI 2005), October 2005).

Alternatively and in addition to calculating the front features at step 940, the features associated with each front can be calculated after the segmentation process has been terminated by continue segmentation step 960. This enables the calculation of features that are dependent upon or constrained by the final segmentation map. For example the distance map (and features derived from it) needs to be calculated from the object boundaries of the final segmentation map.

In the link-connected fronts with segmentation front paths step 950, each labeled connected front is linked into a parent-child relationship with a previous labeled segmentation front generating a segmentation front path. A segmentation front path is the list of distinct segmentation fronts traversed, starting from the seed point 205, in which successive segmentation fronts are linked together by a parent child relationship. Hence a data-structure in the form of a tree is created where each segmentation front path represents a unique path through the tree structure.

In the continue segmentation step 960, a decision is made whether to continue looping through the segmentation process. One way the processing can finish is if there are no active segmentation fronts available for further segmentation growth. Another way the processing can terminate is if the segmentation front paths indicate that the only current segmentation growth is occurring within normal anatomy, see below. The loop processing within the initial lesion segmenter 810 can also be stopped if a condition specified by parameter value D2 contained in the image processing parameters 206 is meet. For example, the total number of voxels contained in the segmentation map has exceeded a given threshold. At this stage, voxels within the initial segmentation map 815 are classified either as being lesion or background.

A preferred embodiment of the initial lesion segmenter 810 employs a version of the Fast-Marching method described by J. A. Sethian in the publication "Level Set Methods and Fast Marching Methods", Cambridge University Press, 1999. The fast marching approach models the segmentation process as a propagating wave front, a surface in 3D or a curve in 2D, which over time is moved by image and non-image driven forces to the boundaries of the desired objects. The wave front corresponds to the segmentation front defined previously. The propagating wave front may be described by the eikonal Equation:

$$\left(\frac{\partial t}{\partial x}\right)^2 + \left(\frac{\partial t}{\partial y}\right)^2 + \left(\frac{\partial t}{\partial z}\right)^2 = \frac{1}{s^2(x, y, z)} = c(x, y, z) \quad (1)$$

where t is the time at which the front crosses point (x, y, z), s is the speed function, and c is the cost function.

The fast marching method solves Equation (1) by directly mimicking the advancing wave front. Every point on the computational grid is classified into three groups: points behind the wave front who have already been segmented, whose travel times are known and fixed; points on the wave front, whose travel times have been calculated, but are not yet been segmented; and points ahead of the wave front. The algorithm then proceeds as follows:
 1) Choose the point on the wave front with the smallest travel time.
 2) Fix this travel time.
 3) Advance the wave front, so that this point is behind it, and adjacent points are either on the wave front or behind it.
 4) Update the travel times for adjacent points on the wave front by solving Equation (1) numerically.
 5) Repeat until every point is behind the wave front or until a stopping condition has been meet.

Different cost-functions can be used in the context of a fast-marching approach. For example, the cost-function can be based on the magnitude of the gradient of voxel values. Another cost-function can be based on the curvature of surface normal vectors. Additionally, a combination of cost-functions can serve as cost-function. A preferred embodiment used a binary cost-function that returns 1 for voxels whose value is above a given threshold and infinity for voxels whose value is below or equal to the threshold. By choosing a cost function that returns infinity for a voxel value below the threshold results in the inactivation (or freezing) of the segmentation front at that voxel. This type of cost function yields a geodesic distance map that associates each voxel within the segmentation with its geodesic distance from the seed point 205. A threshold value of approximately −400 HU is adequate for segmenting solid-type pulmonary lesions. The cost-function threshold value, included in the image processing parameters 206, can be a parameter that is application specific or even preferentially set by an individual radiologist. In a preferred implementation of the fast marching approach, parameter values D1 and D2 contained in the image processing parameters 206 respectively represent an increment in the geodesic distance traveled from the current segmentation front to a voxel and the geodesic distance from the seed point 205 to an active segmentation front. In the preferred implementation the incremental geodesic distance between segmentation fronts controlled by D1 is set equal to one and the total geodesic distance traveled before stopping initial lesion segmenter 810 controlled by D2 is set equal to 40 mm.

One skilled in the art will recognize that there are different algorithms that can be used to calculate a geodesic distance map or a cost weight variant of geodesic distance map that can be utilize in the current invention.

The initial lesion segmenter 810 often expands beyond the target and in the case of segmenting lesions, can include regions that correspond to normal anatomy. There are many types of pulmonary lesions that can be distinguished by the analysis of the segmentation front paths 820. The segmentation front paths 820 can be use to ascertain regions that correspond to normal anatomy and to generate surfaces that separate the lesion from normal anatomy within the initial segmented region. The segmentation front paths 820 generated by the initial lesion segmenter 810 are analyzed for structural characteristics by the segmentation front path analyzer 830. The features computed in step 940 are used to analyze the segmentation front paths or sections of a segmentation front path. For many cases, a plot of the number of voxels in a segmentation front plotted for successive segmentation fronts reveals much about the underlying anatomical structure. For isotropically sampled voxel data, the number of voxel relates directly to the surface area of a segmentation front. For anistropically sampled voxel data, the number of voxels in the segmentation front can be used as a surrogate for the surface area.

Idealized plots for a sessile juxta-pleural lesion 1110, a juxta-vascular lesion 1120, a juxta-vascular lesion attached via a vessel to another anatomical structure 1130, and a lesion containing a spiculated tentacle 1140 are shown in FIGS. 10A, 10B, and 10C. In the sessile juxta-pleural lesion 1110, when the advancing segmentation front path penetrates into the lung wall or mediastinum, the progression of surface area values starts to increase substantially (approximately squared distance relationship) as a function of path-length (geodesic distance from the seed point 205 to a given segmentation front). An unrestrained segmentation front surface will have a corresponding surface area progression that varies approximately as the distance squared. This situation can happen if a seed point is located within a solid mass.

Another anatomical structure that can be differentiated by analyzing the properties of the segmentation front is a spiculated tentacle 1140. As shown in the graph depicted in FIG. 6, the surface area, or number of voxels, of the progression diminishes with path-length until, eventually, the progression terminates. Most spiculated tentacles vanish in just a short path length. Conversely, vessels (juxta-vascular 1120) tend to have corresponding progressions of surface area that are relatively constant as a function of path-length. Additionally, larger vessels have correspondingly greater number of voxels and larger surface area values. The surface area of the segmentation fronts that correspond to vessels essentially represents the cross-sectional area of the vessel since the segmentation front surface progression tends to follow the axis of vessels. By observation, most spiculated tentacles have smaller corresponding surface area values associated with their respective segmentation fronts.

Lesions, especially cancerous lesions, can grow along vessels and form spiculated tentacles that connect to another anatomical structure. When a lesion is connected to another structure, e.g. another lesion, the chest wall or heart, the progression of surface area values, or number of voxels, can initially diminish as a function of path-length and then increase. The increase in the surface area value corresponds to the segmentation front surface passing the intersection point with a different anatomical structure. If the segmentation front of a segmentation front path progress along a vessel, the corresponding surface area values can stay relatively constant (while in the vessel) and then increase when a larger anatomical structure is intersected as shown in the graph of FIG. 10. For the case of a pedunculated juxta-pleural lesion, the progression of surface area values corresponding to the pedicle structure can be constant, diminish, diminish and then increase, or just increase. However, when the corresponding segmentation front progresses past the intersection with the chest wall, the progression embarks on an approximately squared distance relationship as described above.

The segmentation front paths or sections of a given segmentation front path are classified by the manifestation of predetermined relationships between successive segmentation fronts of a given segmentation front path. The simplest method for distinguishing different types of segmentation front paths from the other types includes using thresholds, range limits, and trend lengths on the number of voxels. An alternative method involves analyzing the number of voxels in the segmentation front path to determine the rate of increase in the number of voxels as a function of the path-length. Vessel-like structures can be identified by examining the plot of the number of voxels in each segmentation front of a segmentation front path, see FIG. 10, for regions where the number of voxels in a segmentation front is below a predetermined threshold and is approximately constant for a minimum given path length. In addition the vessel-like structures can further be identified by examining the shape parameters and directions for each segmentation front for consistency between each segmentation front and consistency with a prior vessel model. Spiculated tentacle-like structures are identified in a similar way by looking for a diminishing progression of number of voxels over a relatively short length with termination. The segmentation fronts and voxels that occur after the identified segmentation front that starts vessel-like structure are classified as vessel (or spiculated tentacle).

Lesions that are attached to large normal structures such as the pleural wall or mediastinum are identified by looking for region where the progression of number of voxels in a wave front part are increasing at a large rate for a relatively long path length, see FIG. 10. When a wave-front part progresses to the stage that it includes roughly 1000 voxels, it is very likely to have intersected with a large anatomical structure. Once this type of segmentation front path has been identified it is necessary to determine where (i.e. at which segmentation front) the intersection between the lesion and large anatomical structure has occurred. In many instances it has been observed that when the segmentation front penetrates a large anatomical structure that ratio of the number of voxels in successive segmentation front is greater than would be expected based upon a squared distance relationship. An approximate boundary between the lesion and normal anatomy is given by the aforementioned segmentation front. The segmentation fronts and voxels that occur before the identified large anatomical structure are classified as lesion type. The segmentation fronts that occur after the large anatomical structure are classified as normal anatomy. If deemed necessary more sophisticated methods can be used to demark the boundary between the lesion and normal anatomy. For example, the intersection points between the identified segmentation front and the boundary between anatomical structure and lung parenchyma can be identified and used to fit a 3 dimensional plane. The segmentation fronts and voxels that occur on the side of the plane containing the seed point are classified as lesion type. The segmentation fronts and voxels that occur on the side of the plane not containing the seed point are classified as normal anatomy and can be removed from the segmentation map.

Figure 12:
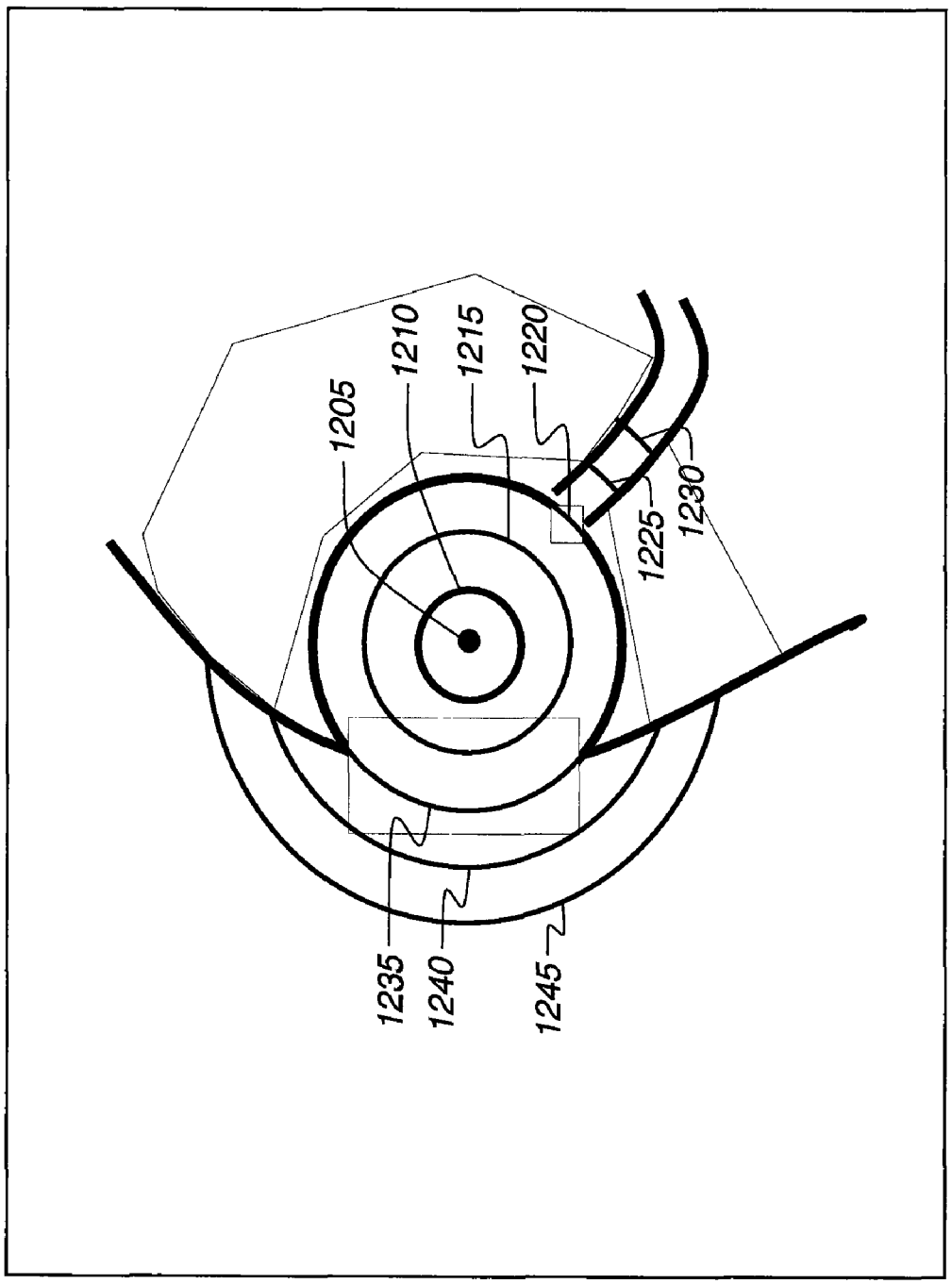
FIG. 12 is diagram showing segmentation fronts generated by a region growing process.
Figure 13:
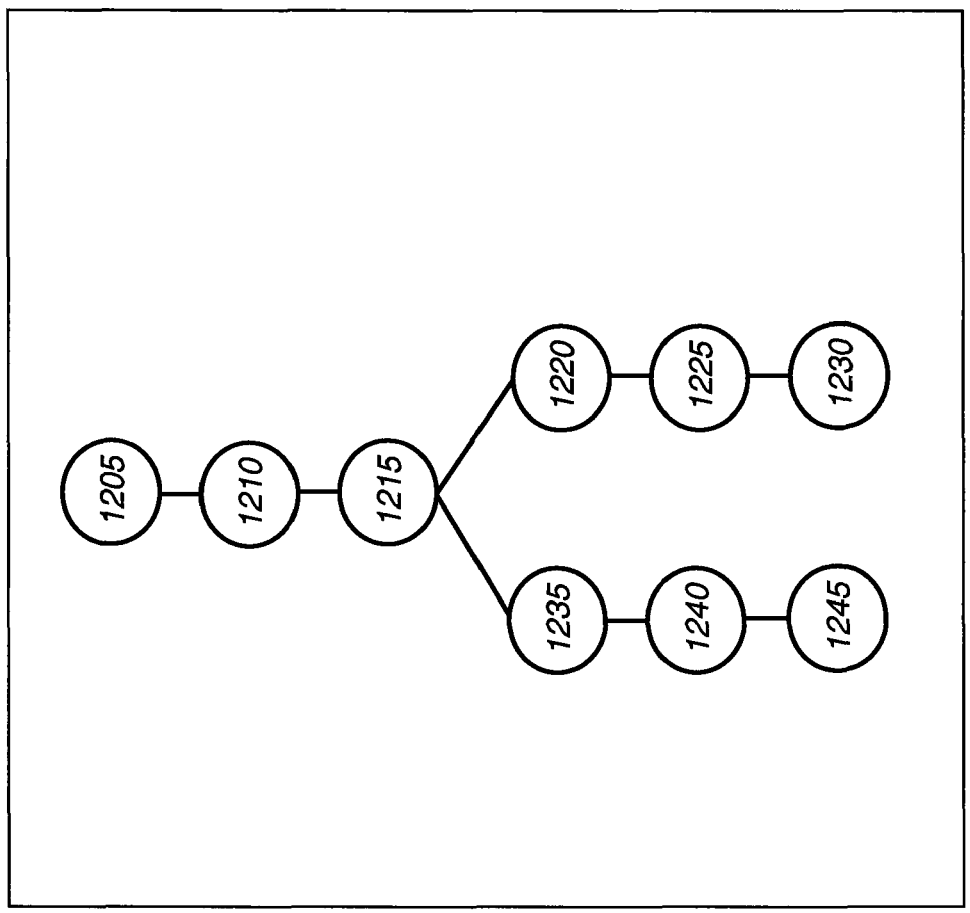
FIG. 13 shows a parent-child relationship between segmentation fronts.

FIG. 12 shows a schematic 2-dimensional representation of a lesion that is both a sessile juxta-pleural and juxta-vascular lesion and the resulting segmentation fronts produced by the initial lesion segmenter 810. The segmentation front 1205, 1210, 1215, 1235, 240, and 1245 represents a single segmentation front path for a sessile juxta-pleural lesion type and segmentation fronts 1205, 1210, 1215, 1220, 1225, and 1230 represents a segmentation front path for a vessel. FIG. 13 shows the parent-child relationship of the segmentation fronts in the form of a tree structure where each segmentation path represents a unique path through the tree structure. The region within the initial segmentation map 815 that occurs before the segmentation front 1220 and 1235 is classified as lesion and the region after the segmentation front 1220 is classified as vessel. The segmentation front 1235 can be used to approximately demark the boundary between the lesion and the lung wall. The region within the initial segmentation map 815 after segmentation front 1235 is classified as normal anatomy.

The current invention has been elucidated in the context of segmenting a pulmonary lesion, in particular for the cases where the pulmonary lesion is attached to normal anatomy such as the local pulmonary vasculature and the pleural surface. The current invention can be applied to segmenting any anatomical structure that is attached to other anatomical structures where the image differences between the anatomical structures are not readily discernable in terms of voxel intensity values.

The invention has been described in detail with particular reference to certain preferred embodiments thereof, but it will be understood that variations and modifications can be effected within the scope of the invention.

The invention claimed is:

1. A method of image segmentation, comprising:
    a) receiving a set of voxels;
    b) segmenting the set of voxels into a foreground group and a background group;
    c) classifying voxels of the foreground group as either lesion voxels or normal anatomy voxels;
    d) blocking the normal anatomy voxels;
    e) performing a second segmentation on voxels of the background group and the lesion voxels, the second segmentation forming a stage two foreground group comprising the lesion voxels and a portion of the voxels of the background group; and
    f) classifying voxels of the stage two foreground group as either stage two lesion voxels or stage two normal anatomy voxels.

2. The method of claim 1, wherein the second segmentation is more aggressive than the segmentation of step b.

3. The method of claim 1, further including blocking the stage two normal anatomy voxels, performing a third segmentation on voxels of the background group and the stage two lesion voxels, the third segmentation forming a stage three foreground group comprising the stage two lesion voxels and a different portion of the voxels of the background group, and classifying voxels of the stage three foreground group as either stage three lesion voxels or stage three normal anatomy voxels.

4. The method of claim 1, further comprising calculating a volume of a lesion associated with the lesion voxels or the stage two lesion voxels.

5. The method of claim 1, further comprising limiting the segmentation of step b with a first set of stopping conditions.

6. The method of claim 5, wherein the first set of stopping conditions is a Hounsfield unit threshold.

7. The method of claim 5, further comprising limiting the second segmentation with a second set of stopping conditions different than the first set.

8. The method of claim 1, further comprising creating a composite class map based on the segmentation of step b and the second segmentation.

9. The method of claim 1, wherein blocking the normal anatomy voxels comprises excluding a plurality of voxels adjacent to the normal anatomy voxels from the second segmentation.

10. A method of image segmentation, comprising:
    a) receiving a set of voxels that were segmented into at least three classes by previous voxel segmentation;
    b) defining a region for a further voxel segmentation, the region excluding voxels of one of the at least three classes;
    c) performing the further voxel segmentation within the region, the further voxel segmentation being more aggressive than the previous voxel segmentation, the further voxel segmentation separating voxels in the region into at least two of the at least three classes; and
    d) creating a composite class map based on the previous voxel segmentation and the further voxel segmentation.

11. The method of claim 10, further comprising identifying a seed point for the further voxel segmentation based on the previous voxel segmentation.

12. The method of claim 10, wherein creating the composite class map comprises rectifying conflicting voxel classifications.

13. The method of claim 10, wherein the first and second sets of stopping conditions are Hounsfield unit thresholds.

14. The method of claim 10, further comprising calculating a volume of a lesion based on a final composite class map.

15. The method of claim 10, wherein the region excludes a plurality of voxels adjacent to a normal anatomy.

16. The method of claim 10, wherein the region excludes voxels associated with more than one anatomical structure.

17. The method of claim 10, further comprising repeating steps b through e at least once.

18. The method of claim 10, wherein the at least three classes comprises a lesion class, a normal anatomy class, and a background class.

19. A method of image segmentation, comprising:
    a) performing a first segmentation capable of distinguishing between a first structure and a second structure but incapable of determining a full extent of the first structure;
    b) defining a region for a second segmentation, the region excluding the second structure; and
    c) performing the second segmentation within the region, the second segmentation capable of determining a greater extent of the first structure than the first segmentation.

20. The method of claim 19, further including defining a second region for a further segmentation, the second region excluding the first structure, and performing the further segmentation within the second region.

21. The method of claim 19, wherein the first segmentation uses a first algorithm limited by a first set of stopping conditions and the second segmentation uses a second algorithm limited by a second set of stopping conditions more aggressive than the first.

22. The method of claim 19, further comprising creating a composite class map based on the first and second segmentations.

* * * * *